May 30, 1933.  J. BALTON  1,911,873
WAFER CUTTING MACHINE
Filed July 21, 1931  6 Sheets-Sheet 1

Inventor
James Balton.
By Albert F. Dieterich
Attorney

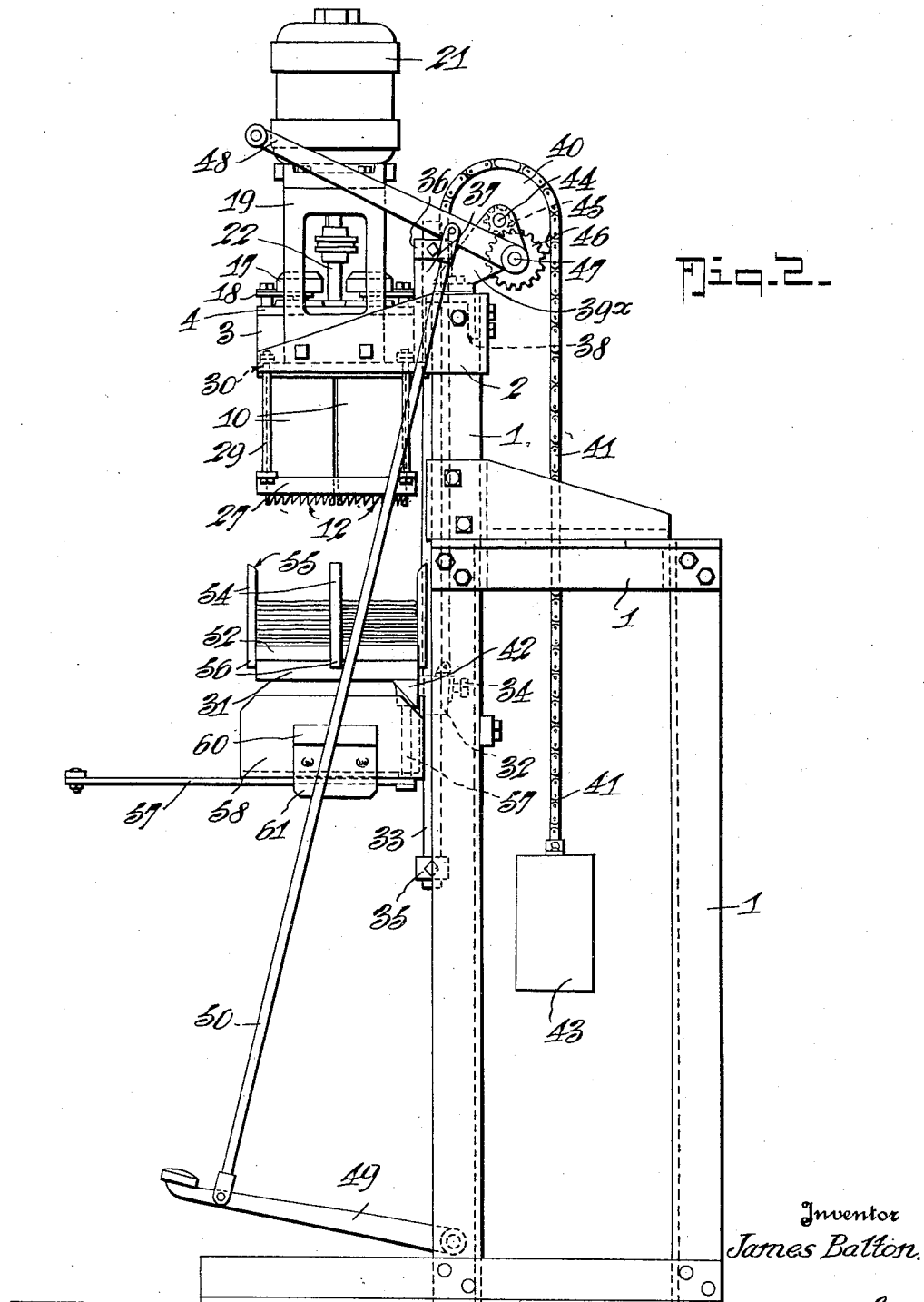

May 30, 1933.   J. BALTON   1,911,873
WAFER CUTTING MACHINE
Filed July 21, 1931   6 Sheets-Sheet 3
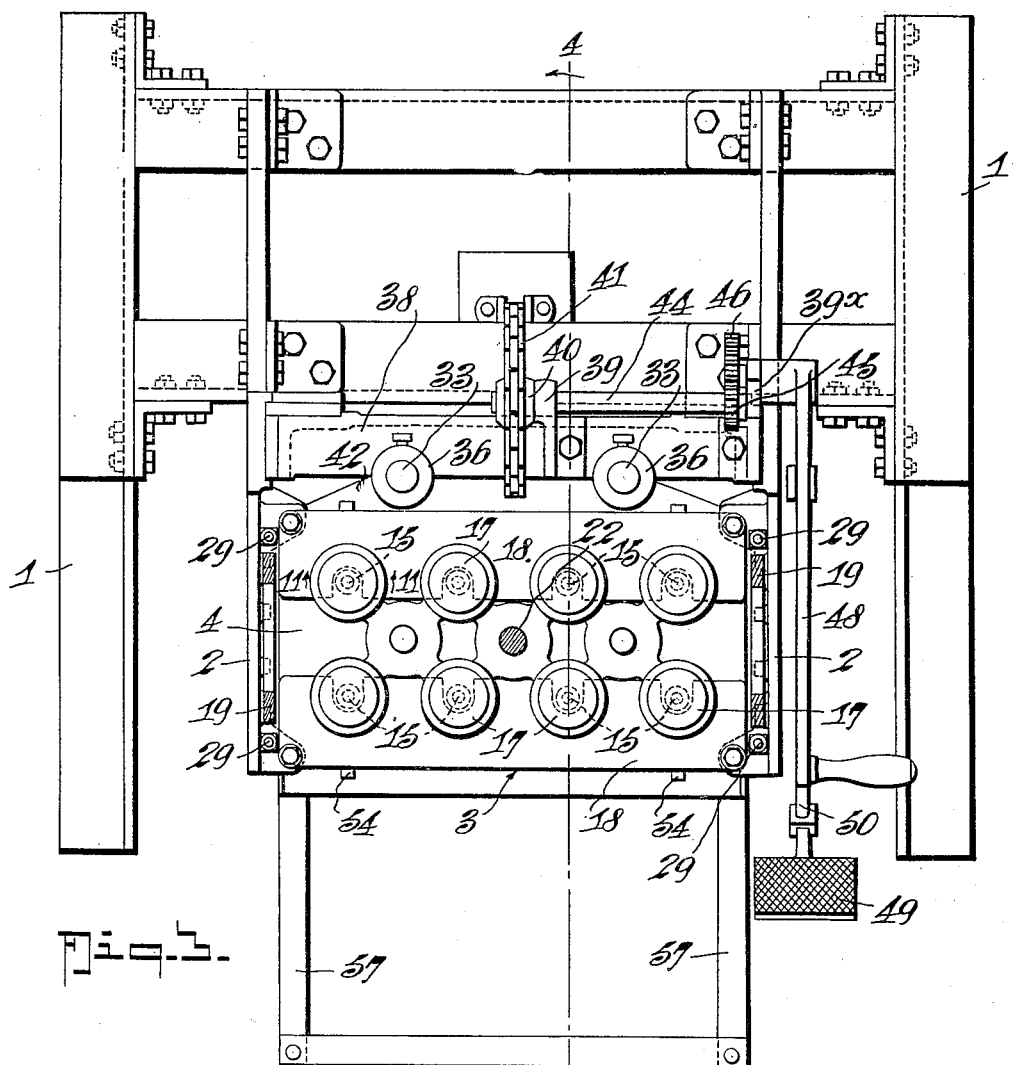
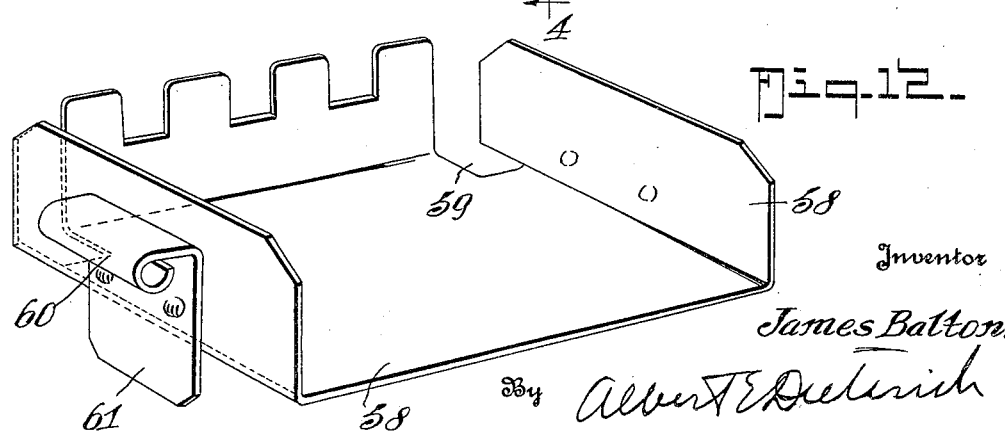
Inventor
James Balton
By Albert E. Dietrich
Attorney

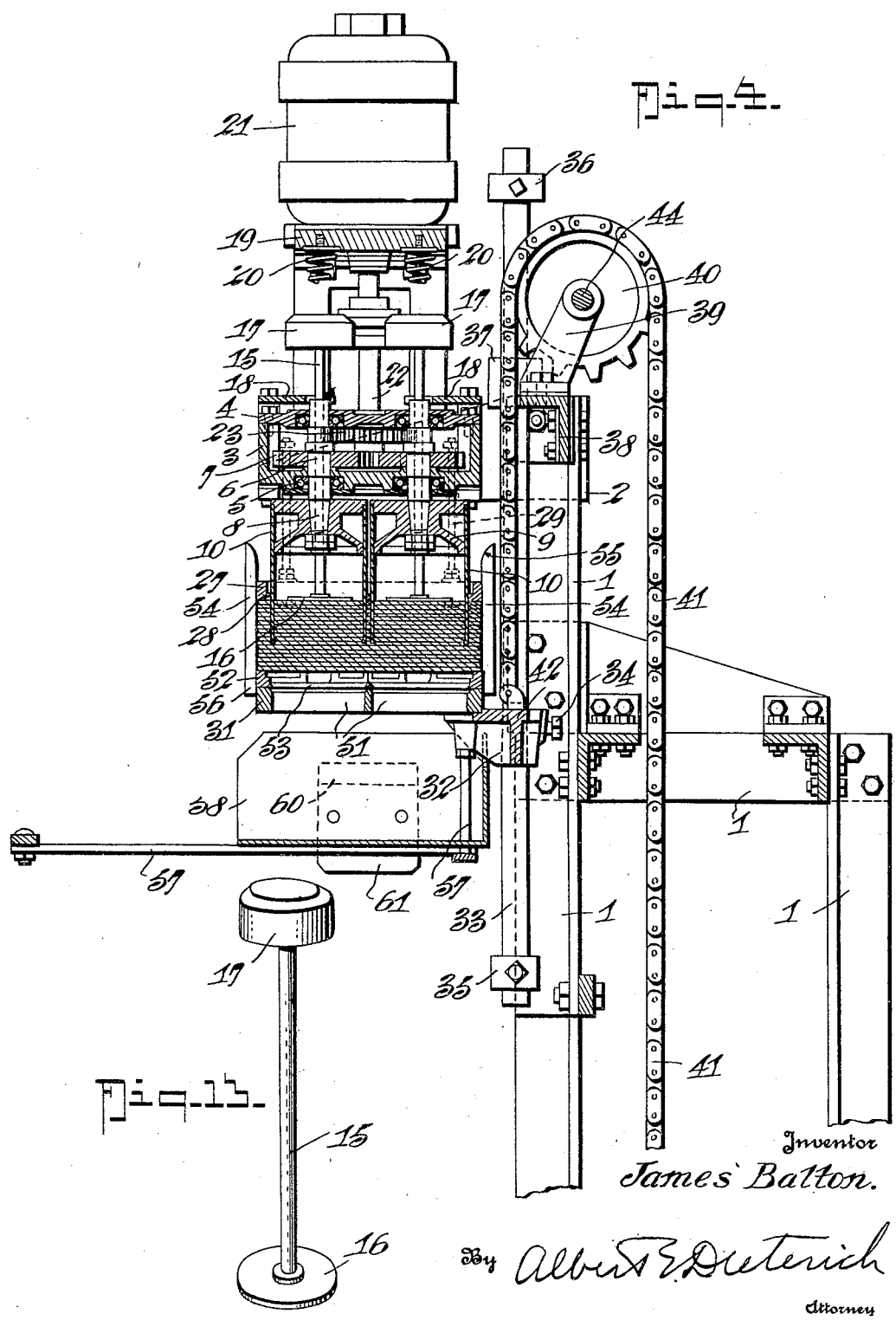

May 30, 1933.   J. BALTON   1,911,873
WAFER CUTTING MACHINE
Filed July 21, 1931   6 Sheets-Sheet 5

Inventor
James Balton.
By Albert R. Dietrich
Attorney

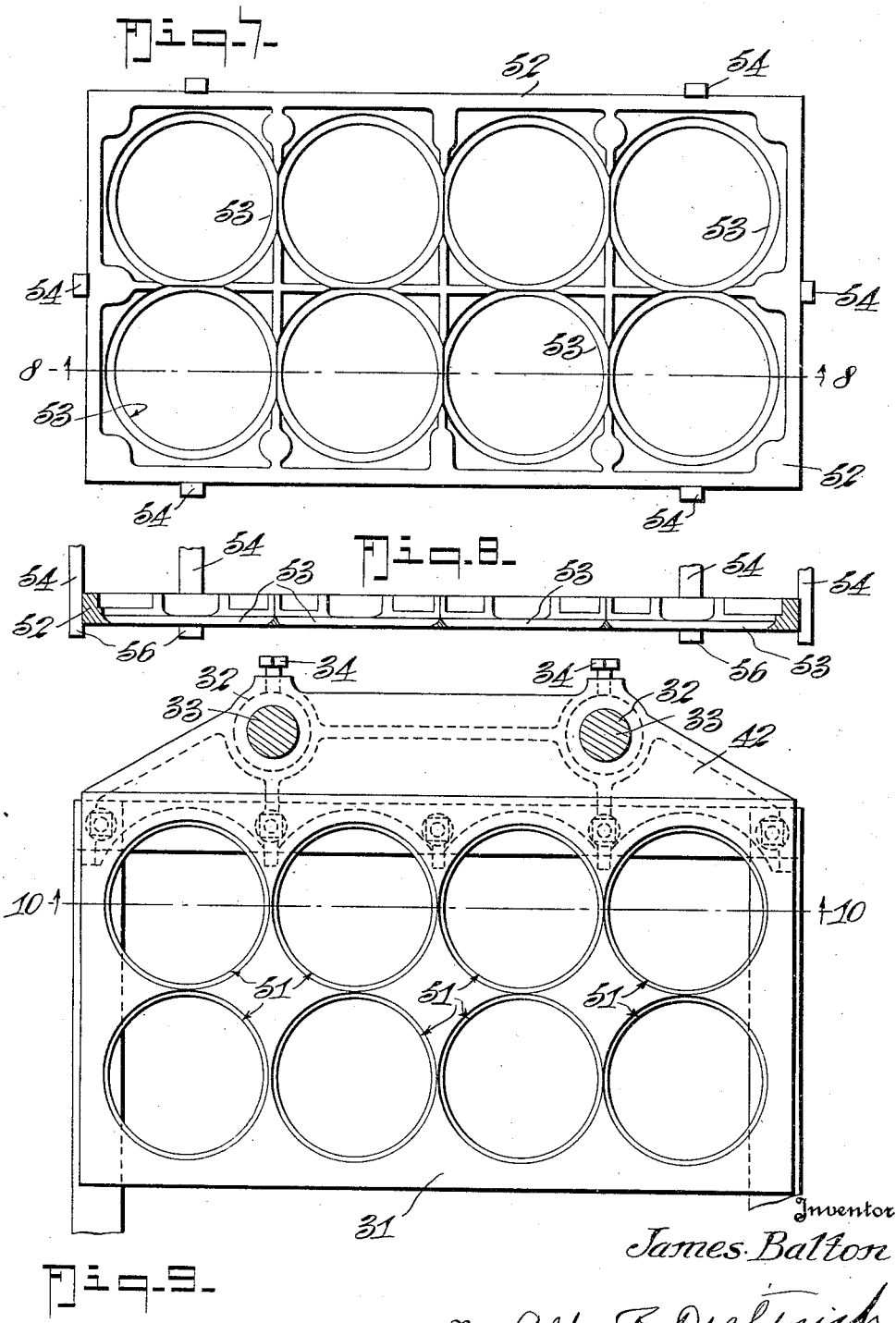

Patented May 30, 1933

1,911,873

UNITED STATES PATENT OFFICE

JAMES BALTON, OF BALTIMORE, MARYLAND, ASSIGNOR TO JOSEPH SHAPIRO, BALTIMORE, MARYLAND

WAFER CUTTING MACHINE

Application filed July 21, 1931. Serial No. 552,269.

The invention has for its object to provide a simple inexpensive machine for cutting wafer disks from sheets of pastry, which disks are usually used in making so-called ice cream sandwiches and the like. Heretofore, it has been the practice to punch the wafers out of single sheets, but all punching machines which have come to my knowledge cause considerable breakage of the material or chipping of the edges of the disks, which render them in many instances unsalable. The wafer sheets are usually provided with deep indentations on one or both faces similar to the well known waffles which add to the difficulties encountered in punching the disks from the sheets.

Further, the old punch press method of stamping the disks from the sheets is a slow one in that only disks from a single sheet at a time can be punched out. My invention therefore has for an object to eliminate the objectionable features of the punch press method, and by enabling the cutting of the disks from a stack of sheets at one operation, greatly speed up the work.

Further, my invention has for its object to eliminate the breakage and chipping of the disks now so common in punch press methods, so as to leave the disks with clean cut edges and by eliminating the breakage and spoilation materially reduce wastage and thereby reduce production costs to a minimum.

Further, the invention has for its object to provide means for forming wafers from wafer sheets, which means will result in the production of a cleaner cut and more salable article than can be obtained by the punch press method heretofore used.

Generally the invention resides in the provision of one or more rotating tubular saws associated with a wafer sheet carrier and feed table which brings a stack of sheets under the influence of the saws, and further associated with a mechanism which holds the cutting disks in their stacked relation against grinding or rotating within the saws while the saws are running and which eventually assists in ejecting the cut disks from the remainder of the stack of disks onto a suitable tray or conveyor for removal from the machine.

Further, it is an object to provide means positively to eject the saw disks in their stacked relation from all saws of a gang simultaneously.

Further, it is an object to provide a wafer tray which carries the wafer sheets and through which the sawn wafers may be ejected as soon as the bottom sheet of the stack has been penetrated by the saw or gang of saws and on which tray the residue sheets will be held in stacked relation while the ejection of the cut wafers takes place, thereby enabling the removal of such residue after the ejection of the cut disks as a unit operation.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:—

Figure 2 is a side elevation of the same with a stack of wafer sheets in position to be fed to the cutters.

Figure 3 is a horizontal section on the line 3—3 of Figure 1.

Figure 4 is a vertical cross section taken on the line 4—4 of Figure 3 and showing the wafer sheets being cut.

Figure 7 is a plan view of the removable sheet carrying trays.

Figure 8 is a longitudinal section of the same on the line 8—8 of Figure 7.

Figure 9 is a plan view of the movable table and table securing bracket, the bracket rods being shown in section.

Figure 12 is a detail perspective view of the wafer disk receiving tray.

Figure 13 is a detail perspective view of the wafer disk holding and ejecting devices.

Figures 1, 11:
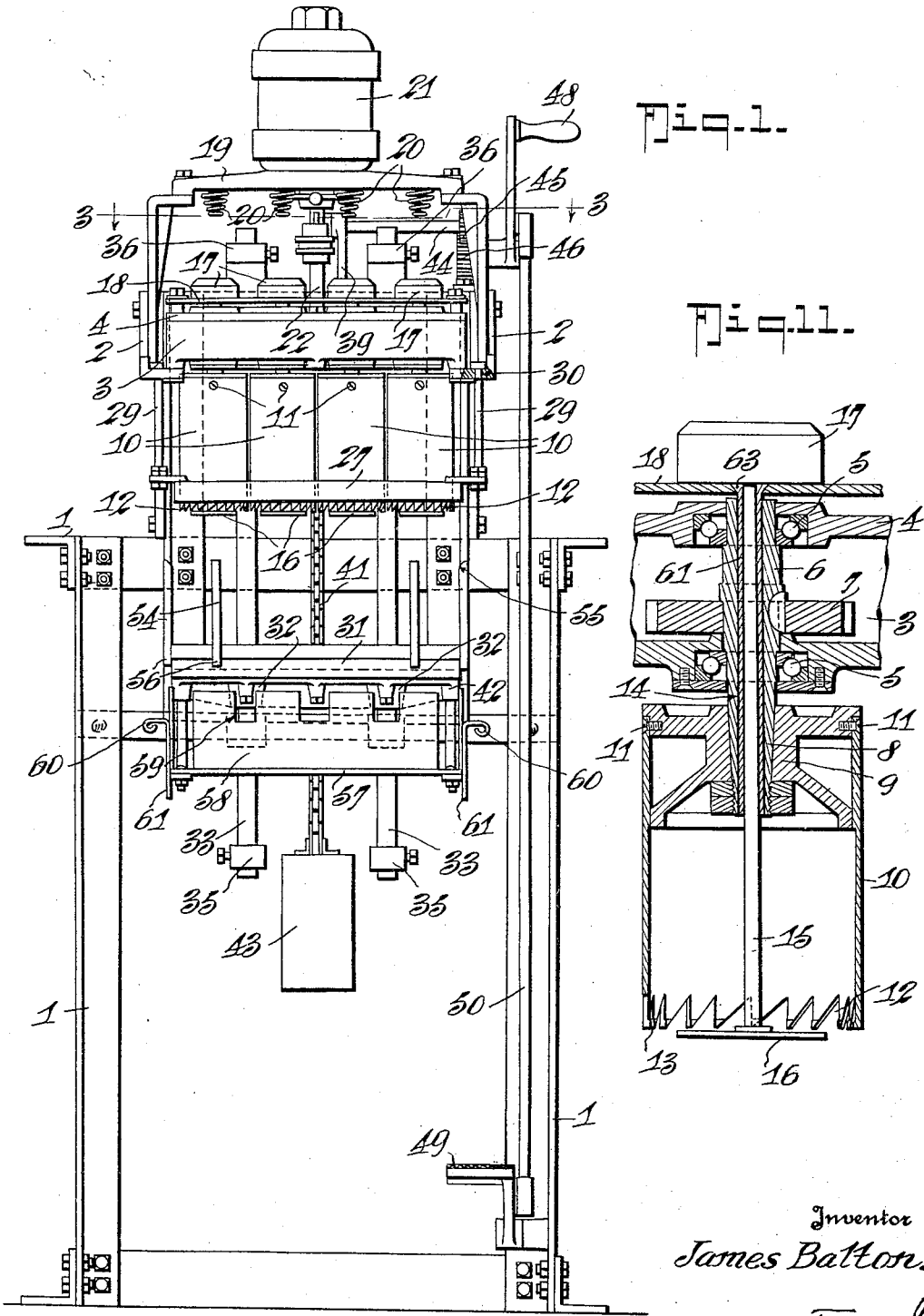
Figure 1 is a front elevation of a machine embodying my invention.
Figure 11 is an enlarged vertical section on the line 11—11 of Figure 3.

Referring to the accompanying drawings, in which like numerals of reference indicate like parts in all of the figures, 1 represents a suitable supporting frame having forwardly extended brackets 2 on which is mounted a gear box or case 3 having a removable cover 4. The gear box including its cover is provided with lower and upper spindle bearings 5 in which the driving spindle 6 of the tubular saws are mounted, the spindle 6 carrying driven gears 7 which are located within the gear box and which will be referred to again later.

Secured to the lower end of the spindle 6 which projects beneath the gear box and is tapered as at 8, is the saw head 9 that carries the barrel or tubular saw 10, the parts being secured together by suitable screws or other suitable devices 11.

The lower end of the tubular saw barrel 10 is formed with the teeth 12, the latter being offset as at 13 to provide a slight clearance between the sawn wafer disks and the interior of the barrel 10.

Each spindle 6 is axially bored as at 14 for the passage of the tube 61 and the rod 15 of the wafer holder and ejector device, the tube 61 fitting loosely in the spindle 6 and the rod 15 fitting loosely in the tube 61, the tube being rigidly secured at 62 to the plate 18.

On the lower end of the rod 15 is fastened a suitable plate or disk 16 of light construction to rest on top of the stack of wafers as they are fed to the saw for the purpose of holding the sawn wafers stacked and against turning with the saw. At the upper end of the rod 15 above the gear box the rod carries a weight 17 which, when the saw is empty, rests on a plate 18 mounted on the cover 4.

19 is a bridge mounted on the brackets 2 for carrying the driving motor 21 which, in the embodiment of the invention illustrated, is an electric motor, whose connections with a source of supply are not indicated as they are conventional, it being understood that a suitable switch is provided for turning the motor on and off at will.

Ejector springs 20 are mounted on the bridge to cooperate with the weights 17 at the upward limit of their movements to impart an initial impetus to the ejector devices at the instant the cut is made through the bottom wafer sheet, thereby to start the ejection process should there be any tendency of the cut wafer disks to bind in the saws.

Figure 5:
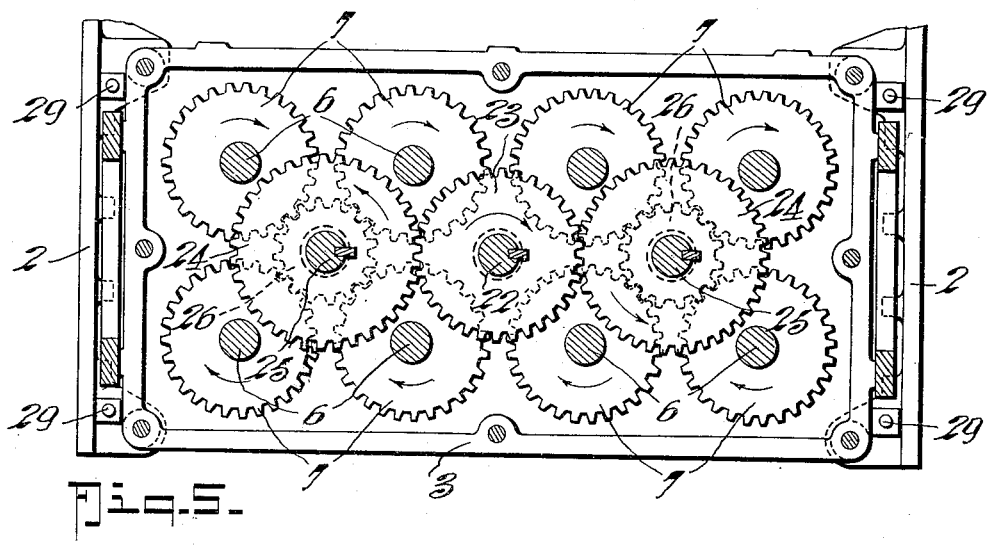
Figure 5 is a plan view of the gear case and gears, the gear case covering having been removed, other parts being shown partly in elevation and partly in section.
Figure 6:
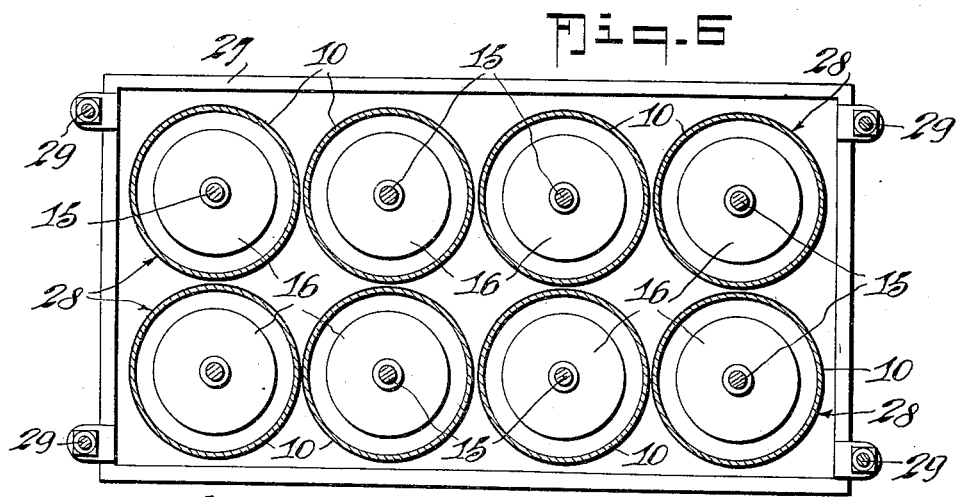
Figure 6 is a horizontal section through the gang of saws above the ejector disks, the waste scrapper plates being shown in plan.
Figure 10:
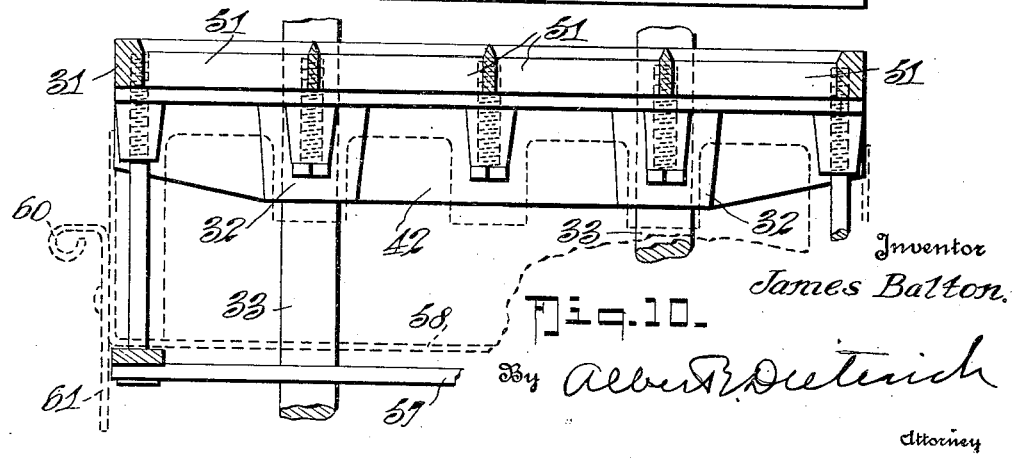
Figure 10 is a longitudinal cross section on the line 10—10 of Figure 9.

The motor's drive shaft is coupled to a shaft 22 which carries a master driving gear 23 that meshes with a pair of master driven gears 24 on suitable countershafts 25 which also carry pinions 26 each to mesh with a group of driven pinions 7. In the embodiment illustrated where eight cutters are employed, each group of gears 7 constitutes four in number as best shown in Figure 5 of the drawings. It will be observed from that figure that the train of gearing is such that all the gears 7 turn in the same direction, that is to say in a clockwise direction when viewed from above. By this arrangement the portions of the gears which are adjacent one another are moved in opposite directions so that the corresponding portions of the cutters also move in opposite directions and thereby prevent the generation of any force which will tend to slide the wafer sheets when contacted by the saw teeth one on the other in any direction. In other words, the directions of rotation of the several saws are so coordinated that the saws do not have a tendency to move the wafer sheets in their own planes and hence no rubbing action between the wafer sheets takes place during the operation of the machine, which rubbing action would tend to crumble the material of the wafers and damage the same.

27 is a waste stripping frame which has openings 28 for the saws and is provided with rods 29 that pass through apertures 30 in the frame 2 so that the plate 27 may rise and fall on the outside of the saws with the movements of the wafer sheets on which the plate 27 rests as the wafer sheets are being fed to the saws.

A suitable table 31 is provided which is mounted on a casting 42, the casting having supporting bosses 32 for the slide rods 33 to which they are secured by set screws 34 as best indicated in Figures 2 and 4 of the drawings. Each rod 33 is provided with lower stops 35 and upper stops 36 that are adjustable on the rod by means of set screws as indicated, the casting 38, which is mounted on the frame 1, having guide bearings 37 for the rods 33, the latter being mounted in those bearings for vertical movement.

Bearing arms 39-39× are provided on the casting 38 for the sprocket shaft 44 on which a sprocket 40 is mounted and over which sprocket the lifting chain 41 is passed, one end of that chain being secured to the casting 32, and the other end carrying a counterweight 43.

The shaft 44 has a pinion 45 which meshes with an operating gear 46 on an operating shaft 47 that is also journalled in suitable bearings in the arms 39, a crank lever 48 being mounted on the shaft 47 so that the table may be raised and lowered by hand if desired, or a treadle 49 may be provided connected to the lever 48 by connecting rods 50 so that the movement of the table may be imparted by foot operation if desired.

The table 31 has wafer disk passes 51 to register with similar passes 53 in the wafer sheet tray 52. The tray 52 is provided with uprights 54 on its margin to embrace the stripper 27 and the gear box 3 to hold the stack of wafer sheets in proper position to be presented to the saws as the table is raised.

In order to hold the tray in proper position on the table the uprights 54 are downwardly extended below the bottom of the tray as at 56 so as to snugly fit the table and be held against displacement thereon. The upper ends of the uprights 54 have their opposing faces bevelled as at 55 to insure proper cooperation with the elements 27 and 3.

A skeleton frame 57 is mounted on the casting 42 and extends a suitable distance below the table in order to support a wafer receiving tray 58 onto which the cut wafers are deposited, the tray having a sufficient number of slots 59 to pass the uprights of the frame 57 so that the back wall of the tray may clear the wafers as they are being deposited on the tray and yet serve as a protector against any wafers falling back out of the tray as the tray is pulled forward for the purpose of conveying the cut wafers from the machine. The tray is provided with suitable handles 60 and side stops 61, the latter serving to locate the tray on the frame 57 against transverse movement.

In using the invention, a stack of wafer sheets of a size to fit within the confines of the uprights 54 on the wafer sheet tray 52 is placed on the tray and the tray is set on the table 31 as indicated in Figure 2. The number of sheets in the stack is limited only to the height of the cutters measured between the bottom and the head 9. In the practical construction of the machine from six to a dozen wafer sheets may be conveniently stacked and sawn at a time. Having placed the tray of wafer sheets on the table the operator then raises the table either by the foot pedal or the crank, bringing the stack of wafer sheets under the influence of the saws.

Just prior to the engagement of the topmost sheet with the saws, the disks 16 are engaged by the topmost sheet and the ejector devices 16, 15, 17 raised to clear the weight 17 from the rest plate 18. As the wafers are engaged by the saws the respective ejector devices will rise also, and by reason of their engagement with the stacked sawn wafers within the tubular saws they will hold the wafers against rotating on themselves with the saws, a thing that has been clearly demonstrated by actual operation of the machine. Without these devices 16, 15, 17 the wafers would tend to creep around on one another with the saws and a rubbing action would be imparted to the contacting surfaces with the result that the wafers would be damaged.

As the stack of wafer sheets approaches its uppermost limit of movement the springs 20 will be compressed by the engagement of the weights 17 therewith so that as the last or bottom-most wafer sheet is sawn, the instant the wafer is cut from the sheet the springs 20 will impart a push to the ejector devices to augment the action of the weights 17 and cause the stacks of sawn wafers to be ejected through the openings 53 and 51 and deposited in their stacked relation on the tray 58 in substantially the same positions relatively to one another as they assume while in the saws. The tray is then removed while the table is in the elevated position and another tray 58 inserted, or the same tray replaced after emptying.

It will be noted that as the tray of wafer sheets is fed to the saws the waste material, i. e. the residue of the sheets, remains stacked and held in that way by the waste stripper frame 27 so that after the wafers have been sawn from the sheets, deposited into the tray 58 as before described, upon lowering the table the residue of sheets will remain in stacked relation on the sheet tray and as soon as the table has been lowered to its lowermost position so as to clear the saws, the sheet tray with its residue may be lifted off the table and a full tray substituted, whereupon the action above described may be repeated on a new stack of sheets.

Instead of employing the trays 58, an ordinary endless conveyor may be run beneath the table to receive the sawn wafer disks as they are ejected and deliver them from the machine.

From the foregoing description, taken in connection with the accompanying drawings, it is thought the complete construction, operation and advantages of my invention will be clear to those skilled in the art to which it relates.

What I claim is:

1. In machines for cutting wafer disks from sheets, a rotary circular tubular saw, means to turn said saw on its longitudinal axis, a feed table for stacks of wafer sheets, means to move said table with its stack of sheets to the saw, means to hold the sawn disks against turning on their axes while the saw is in action and for ejecting the sawn disks upon completion of the action of the saw, a wafer sheet carrier in which the wafer sheets are stacked, said carrier being held on said feed table, said carrier and said feed table having wafer discharge holes in alignment with the saw through which the stacked wafer disks are passed during ejection.

2. In machines for cutting wafer disks from sheets, a rotary circular tubular saw, means to turn said saw on its longitudinal axis, a feed table for stacks of wafer sheets, means to move said table with its stack of sheets to the saw, means to hold the sawn disks against turning on their axes while the saw is in action, and means for ejecting the sawn wafers in a stack from the saw, a wafer sheet carrier in which the wafer sheets are stacked, said carrier being held on said feed table, said carrier and said feed table having wafer discharge holes in alignment with the saw through which the stacked wafer disks are passed during ejection.

3. In machines for cutting wafer disks from sheets, a rotary circular tubular saw, means to turn said saw on its longitudinal axis, a feed table for stacks of wafer sheets, means to move said table with its stack of sheets to the saw, means to hold the sawn disks against turning on their axes while the saw is in action, and means for ejecting the sawn wafers in a stack from the saw upon completion of the sawing act on the last wafer sheet, a wafer sheet carrier in which the wafer sheets are stacked, said carrier being held on said feed table, said carrier and said feed table having wafer discharge holes in alignment with the saw through which the stacked wafer disks are passed during ejection.

4. In machines for cutting wafer disks from sheets, a rotary circular tubular saw, means to turn said saw on its longitudinal axis, a feed table for stacks of wafer sheets, means to move said table with its stack of sheets to the saw, means to hold the sawn disks against turning on their axes while the saw is in action, and means for ejecting the sawn wafers in a stack from the saw upon completion of the sawing act on the last wafer sheet, a wafer sheet carrier in which the wafer sheets are stacked, said carrier being held on said feed table, said carrier and said feed table having wafer discharge holes in alignment with the saw through which the stacked wafer disks are passed during ejection, and a receiver beneath and movable with the table for the ejected stacks of disks.

5. In machines for cutting disk wafers from sheets, a gang of rotary circular tubular saws, means to turn said saws on their longitudinal axes, a feed table for stacks of wafer sheets, means to move said table with the stack of sheets to the saws, and means movable with the table for receiving the stacks of sawn wafers from the saws, and means for retaining the residue of the sheets on the feed table during discharge of the disks from the saws, said saw turning means including provisions for turning opposite parts of saws in opposite directions.

6. In machines for cutting wafer disks from pastry wafer sheets, a frame, a gang of rotating tubular saws carried thereby, power applying means for rotating said saws, a feed table with provisions for feeding a stack of wafer sheets as a unit to the saws, and means located in part within the saws to hold the cut disks stacked while the saws are operating and for ejecting the disks upon completion of the sawing act, said last named means including a gravity actuated disk located in each saw and having a rod extending axially upwardly along the axis of the saw to the outside thereof, and means to impart an initial push to said rods effective only at the end of the sawing act to start the ejection process, and a weight on the extended end of each rod.

7. In machines for cutting wafer disks from pastry wafer sheets, a frame, a gang of rotating tubular saws carried thereby, power applying means for rotating said saws, a feed table with provisions for feeding a stack of wafer sheets as a unit to the saws, and means located in part within the saws to hold the cut disks stacked while the saws are operating and for ejecting the disks upon completion of the sawing act, said last named means including a gravity actuated disk located in each saw and having a rod extending axially upwardly along the axis of the saw to the outside thereof, and means to impart an initial push to said rods at the end of the sawing act to start the ejection process, a weight on the extended end of each rod, and a rest plate for said weights when the saws are empty.

8. In wafer cutting machines, a supporting frame, a gang of rotatable tubular saws carried thereby, power applying and transmitting means to rotate the said saws, a feed table, a wafer sheet carrier for holding stacks of wafer sheets, said carrier having provisions for retaining it in position on said table with a stack of sheets in position to be sawn, means to move said table to advance the stack of sheets to the saws, said carrier and said table having wafer outlets through which the sawn wafers are passed, and a wafer disk-stack receiver located beneath said outlets.

9. In wafer cutting machines, a supporting frame, a gang of rotatable tubular saws carried thereby, power applying and transmitting means to rotate the said saws, a feed table, a wafer sheet carrier for holding stacks of wafer sheets, said carrier having provisions for retaining it in position on said table with a stack of sheets in position to be sawn, means to move said table to advance the stack of sheets to the saws, said carrier and said table having wafer outlets through which the sawn wafers are passed, and a wafer disk-stack receiver located beneath said outlets, and means for holding the wafer sheet residue stacked on the carrier as the table and carrier are withdrawn from the saws.

10. In wafer cutting machines, a supporting frame, a gang of rotatable tubular saws carried thereby, power applying and transmitting means to rotate the said saws, a feed table, a wafer sheet carrier for holding stacks of wafer sheets, said carrier having provisions for retaining it in position on said table with a stack of sheets in position to be sawn, means to move said table to advance the stack of sheets to the saws, said carrier and said table having wafer outlets through which the sawn wafers are passed, and a wafer disk-stack receiver located beneath said outlets, and means for holding the sawn disks stacked as the sawing act takes place and for holding the stacked sawn disks against turning with the saws.

11. In wafer cutting machines, a supporting frame, a gang of rotatable tubular saws carried thereby, power applying and transmitting means to rotate the said saws, a feed table, a wafer sheet carrier for holding stacks of wafer sheets, said carrier having provisions for retaining it in position on said table with a stack of sheets in position to be sawn, means to move said table to advance the stack of sheets to the saws, said carrier and said table having wafer outlets through which the sawn wafers are passed, and a wafer disk-stack receiver located beneath said outlets, and means for holding the wafer sheet residue stacked on the carrier as the table and carrier are withdrawn from the saws, and means for holding the sawn disks stacked as the sawing act takes place and for holding the stacked sawn disks against turning within the saws.

12. In wafer cutting machines, a supporting frame, a gang of rotatable tubular saws carried thereby, power applying and transmitting means to rotate the said saws, a feed table, a wafer sheet carrier for holding stacks of wafer sheets, said carrier having provisions for retaining it in position on said table with a stack of sheets in position to be sawn, means to move said table to advance the stack of sheets to the saws, said carrier and said table having wafer outlets through which the sawn wafers are passed, and a wafer disk-stack receiver located beneath said outlets, and a single means for holding the cut disks stacked and against turning with the saws and for ejecting the cut disks from the saws on completion of the sawing act.

13. In wafer cutting machines, a supporting frame, a gang of rotatable tubular saws carried thereby, power applying and transmitting means to rotate the said saws, a feed table, a wafer sheet carrier for holding stacks of wafer sheets, said carrier having provisions for retaining it in position on said table with a stack of sheets in position to be sawn, means to move said table to advance the stack of sheets to the saws, said carrier and said table having wafer outlets through which the sawn wafers are passed, and a wafer disk-stack receiver located beneath said outlets, and means for holding the wafer sheet residue stacked on the carrier as the table and carrier are withdrawn from the saws, and a single means for holding the cut disks stacked and against turning with the saws and for ejecting the cut disks from the saws on completion of the sawing act.

14. In a machine for cutting pastry wafer discs from sheets, a fixedly located gang of tubular saws, means to turn all saws in the same direction on their longitudinal axes, a movable feed table, means to move the table from and toward the saws, a sheet carrier having means to hold a plurality of sheets of wafers in stacked relation, said table having provisions removably to hold said carrier in place thereon, a disc receiving pan located beneath said table and movable therewith, said table and carrier having openings to pass the cut discs to said receiving pan, and means to hold the sawn discs against turning on their axes while the saw is in action and for ejecting the sawn discs from the saws into the receiving pan.

15. In a machine for cutting pastry wafer discs from sheets, a fixedly located gang of tubular saws, means to turn all saws in the same direction on their longitudinal axes, a movable feed table, means to move the table from and toward the saws, a sheet carrier having means to hold a plurality of sheets of wafers in stacked relation, said table having provisions removably to hold said carrier in place thereon, a disc receiving pan located beneath said table and movable therewith, said table and carrier having openings to pass the cut discs to said receiving pan, and means to hold the sawn discs against turning on their axes while the saw is in action and for ejecting the sawn discs from the saws into the receiving pan, the teeth of said saws being offset inwardly to make a cut of greater thickness than the thickness of the saws' walls whereby the sawn discs will be held free of contact with the saw walls as the ones beneath are being sawn.

16. In a machine for cutting wafer discs from pastry sheets, two parallel gangs of rotating circular tubular saws, means to turn all saws on their respective axes in the same direction whereby the opposite parts of adjacent saws will turn in opposite directions, a feed table, a wafer sheet-stack carrier, means to hold said carrier in a fixed position on said table, a disc receiver located beneath and movable with the table, means to move said table with the stack carrier to present the stack of sheets to the saws.

17. In wafer cutting machines, a supporting frame, a gang of rotatable tubular saws carried thereby, a power applying and transmitting means to rotate the said saws, a feed table, a wafer sheet carrier for holding stacks of wafer sheets, said carrier having provisions for retaining it in position on said table with a stack of sheets in position to be sawn, means to move said table to advance the stack of sheets to the saws, said carrier and said table having wafer outlets through which the sawn wafers are passed, and a wafer disc-stack receiver located beneath said outlets, and means for holding the sawn discs stacked as the sawing act takes place and for holding the stacked sawn discs against turning with the saws, said saws having offset teeth whereby the cut made by them is wider than the thickness of the saws' walls, substantially as and for the purposes stated.

JAMES BALTON.